US006912768B2

(12) United States Patent
Whitehead

(10) Patent No.: US 6,912,768 B2
(45) Date of Patent: Jul. 5, 2005

(54) METHOD FOR LOCKING DUAL OVERHEAD CAMSHAFTS

(75) Inventor: Michael L. Whitehead, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 44 days.

(21) Appl. No.: 10/704,991

(22) Filed: Nov. 10, 2003

(65) Prior Publication Data

US 2004/0098851 A1 May 27, 2004

Related U.S. Application Data

(62) Division of application No. 10/273,245, filed on Oct. 17, 2002, now Pat. No. 6,694,587.

(60) Provisional application No. 60/337,046, filed on Nov. 8, 2001.

(51) Int. Cl.[7] .......... B23Q 7/00

(52) U.S. Cl. .......... 29/559; 29/888.011; 29/402.08; 29/464

(58) Field of Search .......... 29/888.011, 888.1, 29/402.01, 402.03, 402.08, 281.5, 559, 464, 468

(56) References Cited

U.S. PATENT DOCUMENTS

| | | | | |
|---|---|---|---|---|
| 4,684,357 A | | 8/1987 | Hooper | |
| 5,454,153 A | * | 10/1995 | Noel | 29/281.1 |
| 5,490,582 A | | 2/1996 | Trowbridge | |
| 5,755,029 A | | 5/1998 | Learned | |
| 5,950,294 A | | 9/1999 | Gibbs | |
| 6,058,585 A | | 5/2000 | Soleymani | |
| 6,332,256 B1 | | 12/2001 | Dawson | |
| 6,530,135 B1 | * | 3/2003 | Soleymani | 29/281.5 |
| 6,698,075 B1 | * | 3/2004 | Wu | 29/281.5 |

FOREIGN PATENT DOCUMENTS

GB 2 340 539 A 2/2000

OTHER PUBLICATIONS

U.S. Appl. No. 5,755,029, Request for Ex Parte Reexamination, Control No. 90/007,011; filed Apr. 22, 2004.

* cited by examiner

*Primary Examiner*—David P. Bryant
(74) *Attorney, Agent, or Firm*—Banner & Witcoff, Ltd.

(57) ABSTRACT

A method for locking the sprockets or gears of a dual overhead camshaft engine in a fixed position includes two spaced bars with studs for engaging against the inside rim of the sprockets and a means for adjusting the spacing of the bars to frictionally maintain the sprockets in a locked position against the inside rims.

4 Claims, 2 Drawing Sheets

FIG. 1
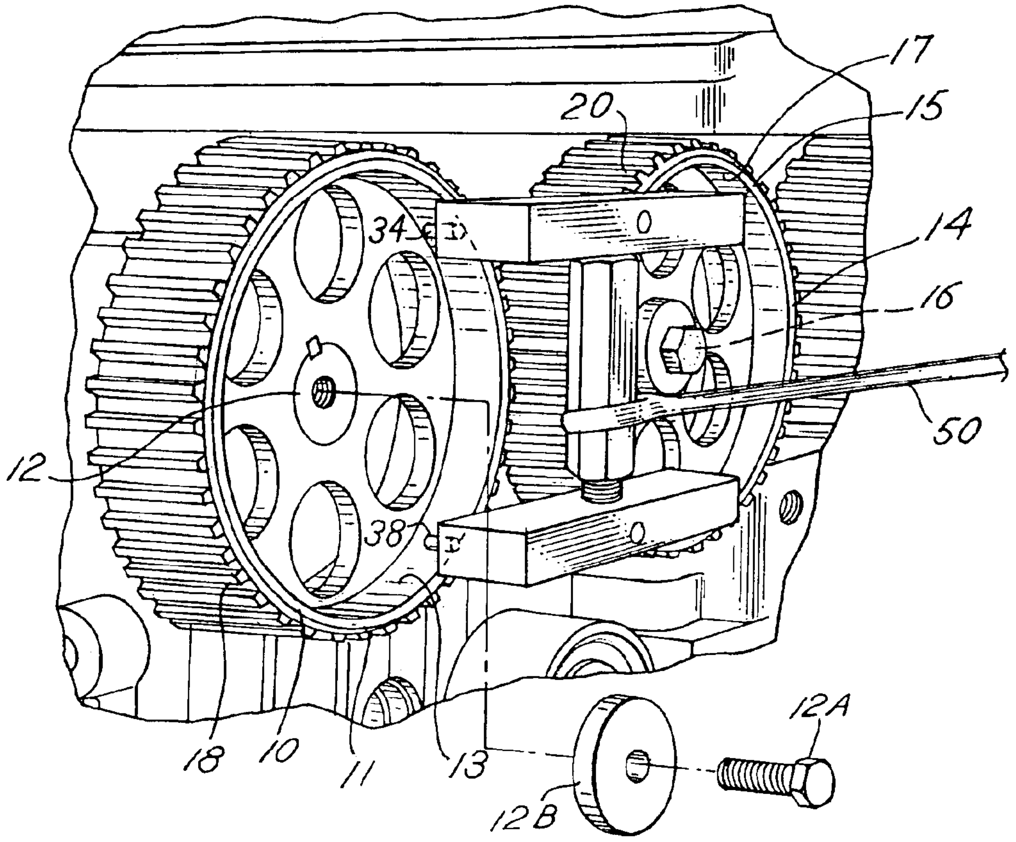
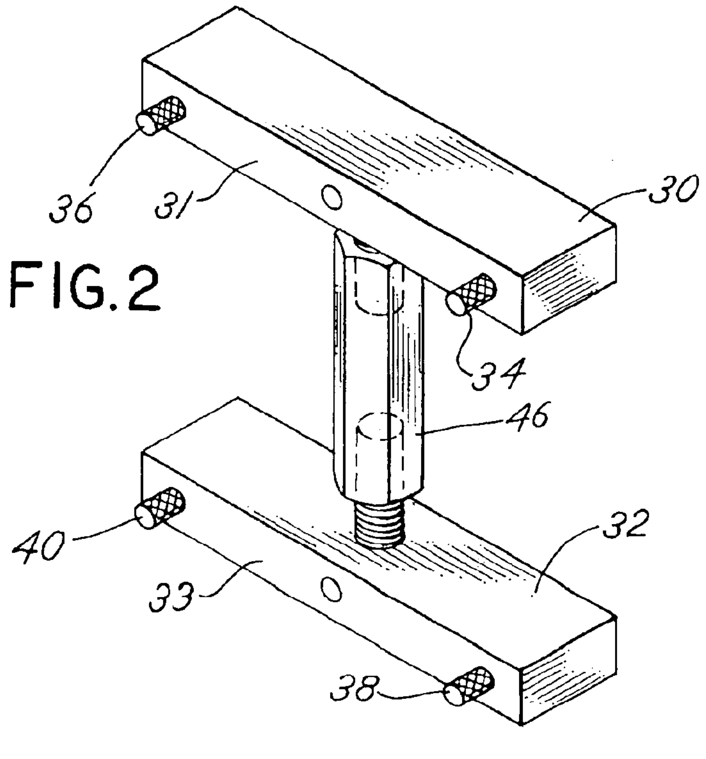
FIG. 2

FIG.3A
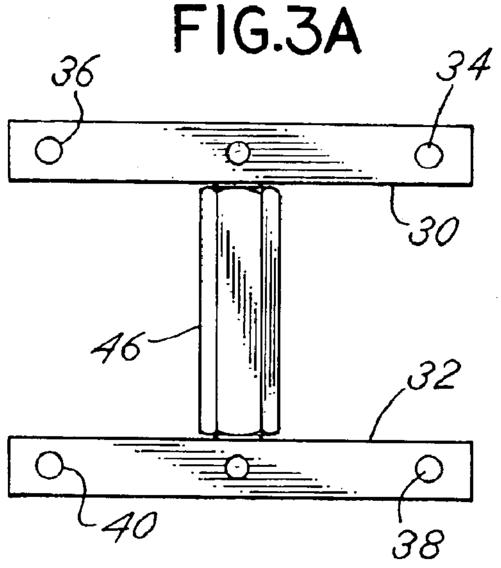
FIG.3B
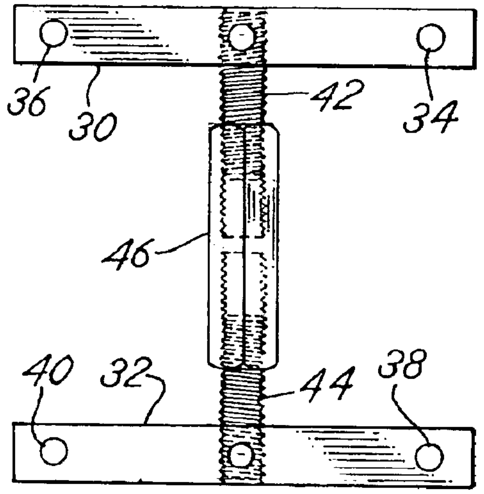
FIG.4
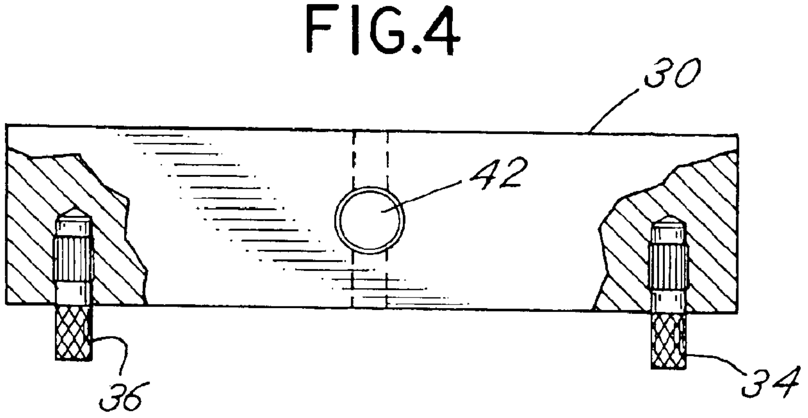
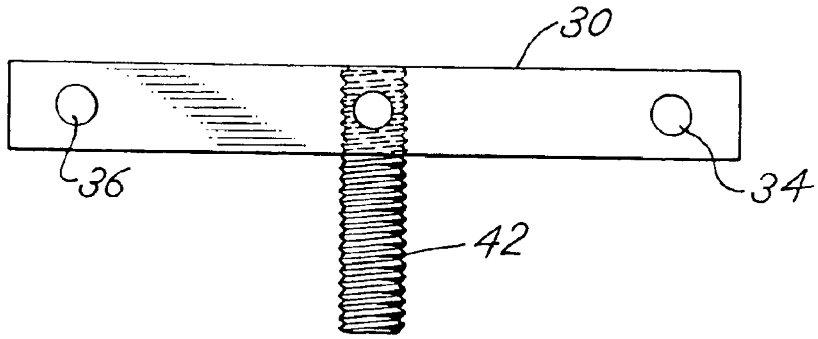
FIG.5

METHOD FOR LOCKING DUAL OVERHEAD CAMSHAFTS

CROSS REFERENCE TO RELATED APPLICATION

This is a division of a utility application Ser. No. 10/273,245, filed Oct. 17, 2002, now U.S. Pat. No. 6,694,587, for a DUAL OVERHEAD CAMSHAFT LOCKING TOOL, which is based upon earlier filed provisional application Ser. No. 60/337,046, filed Nov. 8, 2001, for a DOUBLE CAMSHAFT LOCKING TOOL, which are incorporated herewith by reference and for which priority is claimed.

BACKGROUND OF THE INVENTION

In a principal aspect, the present invention relates to a tool for locking two camshafts in a non-rotatable position.

When repairing modem internal combustion engines of the type utilizing dual overhead cams, the camshafts, which activate the cams of the engine associated with the input and exhaust valves, are operative in response to timing gears or belts which rotate the dual camshafts in a precise manner. When attempting to repair a vehicle engine of this type it is desirable, if not necessary, to lock the camshafts in a fixed position relative to the other mechanical parts of the engine.

Various mechanisms have been proposed to effect such locking. For example, Dawson in U.S. Pat. No. 6,332,256 B1 for a Holding Device discloses a tool having four separate holding elements each of which is adjustable so as to engage the sprocket teeth of sprockets associated with the dual camshafts incorporated in the internal combustion engine. An earlier British patent to Dawson GB 230539A for a Device for Holding Rotary Elements, e.g. Engine Timing Belt Sprockets Against Rotation discloses another mechanism for locking the camshaft spurgears or sprockets in position by engaging the teeth of the sprockets and holding them in a non-rotatable position. Learned in U.S. Pat. No. 5,755,029 entitled Dual Overhead Overhead Camshaft Alignment Method depicts yet another tool or apparatus for engaging the sprocket teeth of the camshaft sprockets of an internal combustion engine. Finally, additional patents which show mechanisms of this general nature include Gibbs, U.S. Pat. No. 5,950,294 for a Tool for Immobilizing Camshaft Gears and U.S. Pat. No. 6,058,585 for a Cam-stopper.

Each of the mentioned references disclose mechanisms which engage the spurgears or teeth of the camshaft sprockets to prevent undesired rotation thereof and to lock the camshafts in a fixed position. Such mechanisms work well, but ultimately require significant adjustment and manipulation in order to become properly engaged with the spurgear teeth. Thus, there has remained a need for an improved mechanism for locking the gears or sprockets associated with a double or dual camshaft arrangement in an internal combustion engine.

SUMMARY OF THE INVENTION

Briefly, the present invention comprises a tool for locking the camshafts of a double or dual camshaft internal combustion engine of the type having spurgears or sprockets associated with a timing belt. Thus, dual overhead camshafts are mounted on an engine head and each includes an axially projecting shaft with a timing gear or sprocket mounted on the end of each shaft. Each gear or sprocket includes teeth that are designed to engage with a timing belt, for example. The sprockets typically include an inside rim as well as the outside peripheral teeth. The sprockets are generally coplanar, transverse to the camshaft axes and rotatable on the axis of the respective shaft.

The tool comprises a first cross bar which includes generally parallel studs projecting from the opposite ends of the cross bar. A second cross bar has a substantially identical construction with generally parallel studs projecting from the opposite ends of the bar. An adjustable length connector connects the midpoints of the respective cross bars to control the spacing of the cross bars one from the other in a manner whereby the studs attached to each of the respective bars may be engaged with the inside rim of the sprockets or camshaft gears to hold the gears in a non-rotatable position. This is accomplished by adjusting the connector to wedge the studs tightly against the inside rims of the sprockets or gears thereby precluding movement of the gears. In a preferred embodiment, the studs include milled, knurled or patterned outside surfaces to further enhance the frictional grip between the studs and the inside rim of the gears.

Thus, it is an object of the invention to provide an improved tool for locking the sprockets or gears of a double or dual overhead camshaft in a fixed position so that a timing belt or gears may be removed and the engine may be repaired without displacing the position of the respective camshafts.

Yet another object of the invention is to provide a tool which is rugged, easy to use, economical and durable.

A further object of the invention is to provide a tool for locking the dual camshafts in a fixed position utilizing frictional engagement with studs projecting from the tool against the inside rim of the camshaft sprockets or gears.

These and other objects, advantages and features of the invention will be set forth in a detailed description which follows.

BRIEF DESCRIPTION OF THE DRAWING

In the detailed description which follows, reference will be made to the drawing comprised of the following figures:

FIG. 1 is an isometric view of the tool of the invention positioned for engagement with the camshaft sprockets or gears of a dual overhead camshaft engine;

FIG. 2 is an isometric view of the tool utilized in the practice of the invention depicted in FIG. 1;

FIG. 3A is a plan view of the tool of FIG. 2 wherein the cross bars having studs projecting from the opposite ends thereof are moved to their closest position;

FIG. 3B is a plan view of the tool of FIG. 3A wherein the cross bars have been moved to an open or spread position;

FIG. 4 is a cross-sectional view of the stud construction incorporated with the cross bars of the tool of the invention; and FIG. 5 is a plan view of one of the cross bars utilized in the tool of the invention.

DESCRIPTION OF THE PREFERRED EMBODIMENT

The tool of the present invention is designed to engage and hold the camshaft sprockets or gears of a dual overhead cam, internal combustion engine. Typically, such an engine will include a first camshaft 12 and a second camshaft 16, each having a sprocket or gear attached to the end of each camshaft. The two gears are designed to cooperate with and be driven by a timing belt so that the camshafts will operate appropriately and synchronously to effect appropriate, sequential operation of the valves of the internal combustion engine. When attempting to repair such an internal combustion engine, for example, by replacing the timing belt, it is absolutely necessary to maintain the proper position and orientation of the timing gears or sprockets. The present tool provides a means for maintaining the position of the timing gears upon removal of the timing chain, or timing belt, from the timing gears or sprockets.

As shown in FIG. 1, an internal combustion engine includes a first timing gear 10 mounted on a camshaft 12. A second timing gear 14 is mounted on a camshaft 16 parallel to the first camshaft 12. The first timing gear 10 includes a rim 11 with an outside face having timing teeth 18 and an inside surface 13. Similarly, the second timing gear 14 includes a rim 15 with an outside face with timing teeth 20 and an inside surface 17. When the internal combustion engine associated with the gears 10 and 14 is in assembled working condition, the timing gears 10 and 14 are engaged with timing belts (not shown) so that the gears 10 and 14 and associated camshafts 12, 16 will rotate synchronously in a manner to properly control the valves associated with the cams of the first and second cam drive shafts 12 and 16. Removal of a timing belt, however, can occur only if the timing gears 10 and 14 are maintained in a fixed position so as to maintain the timing relationship for the valves of the internal combustion engine. Inappropriate rotation of the gears 10 and 14 could result in a disastrous consequence upon replacement of a timing belt.

The present invention comprises a tool which locks the timing gears 10 and 14 into position to permit removal of timing belts associated with the timing gears 10 and 14. Specifically, as shown in FIG. 2, the tool is comprised of a first cross bar 30 and a spaced parallel, second cross bar 32. In the embodiment depicted in FIG. 3, the cross bars 30 and 32 are straight bar members of equal size and dimension. The first bar 30 includes first and second projecting studs 34 and 36 extending outwardly from a face 31 of the bar 30. The second cross bar 32 includes similar studs; namely, third and fourth studs 38 and 40 likewise projecting from the face 33 of second cross bar 32. Preferably, the studs 34, 36, 38 and 40 are all aligned coaxially (i.e. parallel), and when in use in combination with an internal combustion engine, they extend in a parallel relation to the camshafts of the engine.

The first cross bar 30 includes a downwardly projecting threaded rod 42. The second cross bar 32 includes an upwardly projecting threaded rod 44. The threads of the rods 42 and 44 are in an opposite sense. A hexagonal bar stock connector member 46 is threadably engaged with the threaded rods 42 and 44. Rotation of the hexagonal connector member 46 will cause the first and second cross bars 30 and 32 to more closely approach one another or to become more spaced from one another depending upon the sense of rotation of connector member 46.

In the embodiment shown each of the rods 42 and 44 include threaded sections. The invention is not limited to a tool, however, wherein both rods 42, 44 are threaded. The function of the described combination of parts is to serve as a connector assembly between the first cross bar 30 and the second cross bar 32 wherein the connection is adjustable in a manner which permits adjustment of the spacing between the cross bars 30 and 32.

In the preferred embodiment, the connector assembly; namely, the rods 42 and 44 are positioned substantially at the midpoint of the bars 30 and 32. It is possible to provide for asymmetric positioning of rods 42, 44. In the embodiment shown, also, the studs 34, 36, 38 and 40 are generally cylindrical in shape and preferably have knurled outside surfaces. However, other shapes and configurations may be utilized.

FIG. 3-A depicts the tool of FIG. 2 in a first configuration wherein the tool bars 30 and 32 are made to approach one another. FIG. 3-B illustrates how the bars 30 and 32 may be spaced one from the other by operation of the connector assembly and, more particularly, by turning the connector member 46.

FIG. 1 illustrates the manner of use of the tool of FIGS. 2 and 3. Specifically, the studs 34 and 36 of the first cross bar 30 are placed respectively against the inner rim 13, 17 of the timing gears 10 and 14, respectively. Similarly, the third and fourth studs 38 and 40 are positioned against the inner rim 13, 17 of the first and second timing gears 10 and 14. A wrench 50 may then be positioned to turn the connector bar 46 to spread the first and second cross bars 30, 32 and tightly engage or drive the studs 34, 36, 38 and 40 against the inside rims 13, 17 of the timing gears 10 and 14. By driving the studs 34, 36, 38 and 40 against the inside rims 13, 17 of the timing gears 10 and 14, the gears 10, 14 become locked into a fixed position and cannot rotate. Repair work may then be effected on the engine without compromising the timing of the camshafts 12, 16. Thereafter, appropriate timing belts may be engaged with or replaced on the timing gears 10 and 14. The tool of FIGS. 2 and 3 may then be removed by reverse actuation of the wrench 50.

FIGS. 4 and 5 illustrate the construction of the separate cross bars, for example cross bar 30. The studs 34, 36 of the cross bar 30 are formed with knurled or patterned surfaces so that they may be more easily engaged against the inside rim 13, 17 of the timing gear or camshaft gear 10, 14. FIG. 5 illustrates the position of the rod 42 and the interconnection of the rod 42 to the bar 30.

Various alternative constructions are possible. That is, the shape of the cross bars 30 and 32 may be varied. The shape and position of the studs 34, 36, 38 and 40 may be varied, as well as the surface treatment of the studs. The connector assembly may be designed to include a locking feature which insures that once the tool is positioned into place by engaging the gears 10 and 14, that it will not accidentally become disengaged. That is, a locking member may be positioned against the rotatable connector member or handle 46 to prevent undesired rotation thereof. Additional studs may be provided extending in opposite directions from the cross bars 30, 32 to provide for a means to accommodate timing gears having variable sizes and internal rim configurations. The studs 34, 36, 38, 40 may be aligned in combination with the gears 10, 14 in various ways also, e.g. studs 34, 36 may both be engaged with rim surface 13 of gear 10 and studs 38, 40 may both be engaged with rim surface 17 of gear 14 and the handle 46 may be operated to expand or contract the spacing of bars 30, 32. Multiple modes of interaction of the tool and gears 10, 14 are thus possible. Thus, the invention is to be limited only by the following claims and equivalents thereof.

What is claimed is:

1. A method for locking the camshafts of a dual overhead camshaft engine, said camshafts each mounted on an engine and each including an axially projecting shaft with a timing gear mounted on each shaft, each gear including an outside with timing teeth and an inside rim, said gears being generally coplanar transverse to the shaft axes, said method comprising the steps of:

providing a tool with a first cross bar having first and second generally parallel studs projecting from opposite ends of the first bar; a second cross bar having third and fourth generally parallel studs projecting from opposite ends of the second bar, said studs being parallel and extending in the same direction from their respective cross bar, each stud having a frictional outside surface; an adjustable length connector assembly connecting the first bar and second bar for controlling the spacing of the first and second bars whereby the studs of the first bar and the studs of the second bar are frictionally engageable, respectively, with the inside rim of the first and second timing gears; and engaging the studs with said inside rims of said gears and holding the gears in a non-rotatable position by adjusting the connector assembly to wedge against the inside rims of said gears with one stud of the first and second cross bars engaging one gear and the other stud of the first and second cross bars engaging the other gears.

2. The method of claim 1 wherein the outside surface of each of the studs is patterned to increase frictional engagement of the studs and inside rims.

3. A method for locking first and second dual overhead cam sprockets of the type having a rim with a peripheral flange defining an inside surface and outside teeth, said sprockets arranged in side by side, coplanar array with their teeth in opposed relation, comprising the steps of:

positioning a tool having a first cross bar with first and second projecting studs and a second cross bar with third and fourth projecting studs by placing the first and second studs respectively against the inside surface of the flange of the first and second sprockets while simultaneously placing the third and fourth studs respectively against the inside surface of the first and second sprockets; and adjusting the spacing of the cross bars to maintain the studs frictionally engaged with the inside surface of the rims.

4. A method for locking first and second dual overhead cam sprockets of the type having a rim with a peripheral flange defining an inside surface and outside teeth, said sprockets arranged in side by side, coplanar array with their teeth in opposed relation, comprising the steps of:

positioning a tool having a first cross bar with first and second projecting studs and a second cross bar with third and fourth projecting studs by placing the first and second studs against the inside surface of the flange of the first sprocket while simultaneously placing the third and fourth studs against the inside surface of the second sprocket; and adjusting the spacing of the cross bars to maintain the studs frictionally engaged with the inside surface of the rims.

* * * * *